United States Patent
Tirpak (10) Patent No.: US 9,560,391 B2
(45) Date of Patent: Jan. 31, 2017

(54) SYSTEMS AND METHODS FOR COMPILING AND ORGANIZING MULTIPLE EPISODES OF MEDIA CONTENT SERIES

(71) Applicant: ECHOSTAR TECHNOLOGIES L.L.C., Englewood, CO (US)

(72) Inventor: Christopher B. Tirpak, Monument, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 14/809,521

(22) Filed: Jul. 27, 2015

(65) Prior Publication Data

US 2016/0192017 A1 Jun. 30, 2016

Related U.S. Application Data

(60) Provisional application No. 62/097,241, filed on Dec. 29, 2014.

(51) Int. Cl.
*H04N 21/231* (2011.01)
*H04L 12/58* (2006.01)
(Continued)

(52) U.S. Cl.
CPC ...... *H04N 21/23109* (2013.01); *G06F 3/0481* (2013.01); *G06F 3/0482* (2013.01); *G06Q 30/0242* (2013.01); *H04L 51/10* (2013.01); *H04L 51/16* (2013.01); *H04L 65/4069* (2013.01); *H04N 1/00408* (2013.01);
(Continued)

(58) Field of Classification Search
CPC .............. H04N 2005/44565; H04N 21/232; H04N 21/47202; H04N 21/23109; H04N 21/4312; H04N 21/47217; H04N 21/4825; H04N 21/47; H04N 21/4622; H04N 21/482; H04N 1/00501; H04N 1/00408; H04N 2005/44556; H04N 21/25866; H04N 21/4667; H04N 21/4884; H04N 21/44222; H04N 21/252; G06F 3/0604; G06F 17/30843; G06F 3/048; G06F 9/4446; G06F 3/0481; G06F 17/243; G06F 3/0482; H04L 51/16; H04L 65/4069; H04L 51/10; H04H 60/72; H04W 68/00; H04M 1/72552; G06Q 30/0242
(Continued)

(56) References Cited

U.S. PATENT DOCUMENTS 8,271,334 B1 9/2012 Funk et al.
8,397,180 B2 * 3/2013 Duhig .................. G06F 3/0482
345/173

(Continued)

OTHER PUBLICATIONS

European Search Report, EP Application No. 15201630, dated Mar. 24, 2016.

*Primary Examiner* — Hoang-Vu A Nguyen-Ba
(74) *Attorney, Agent, or Firm* — LK Global (57) ABSTRACT

Methods, systems and devices for organizing media content are provided. One method includes receiving a request, via a user interface presented to a user, to compile a requested plurality of episodes of a selected media content. The availability of the requested plurality of episodes are determined from a plurality of media content sources. The requested plurality of episodes are then compiled (e.g., recorded via a digital video recorder or located within a streaming service). A user interface is then presented to the user, including a series-order arrangement of the requested plurality of episodes.

15 Claims, 5 Drawing Sheets

(51) Int. Cl.

| | |
|---|---|
| *H04N 21/482* | (2011.01) |
| *H04L 29/06* | (2006.01) |
| *H04N 21/258* | (2011.01) |
| *H04N 21/466* | (2011.01) |
| *H04N 21/488* | (2011.01) |
| *H04N 21/442* | (2011.01) |
| *H04N 21/472* | (2011.01) |
| *H04N 21/25* | (2011.01) |
| *G06Q 30/02* | (2012.01) |
| *H04N 21/462* | (2011.01) |
| *H04N 1/00* | (2006.01) |
| *G06F 3/0482* | (2013.01) |
| *G06F 3/0481* | (2013.01) |
| *H04N 5/445* | (2011.01) |
| *G06F 17/30* | (2006.01) |

(52) U.S. Cl.
CPC ....... *H04N 1/00501* (2013.01); *H04N 21/252* (2013.01); *H04N 21/25866* (2013.01); *H04N 21/44222* (2013.01); *H04N 21/4622* (2013.01); *H04N 21/4667* (2013.01); *H04N 21/47217* (2013.01); *H04N 21/482* (2013.01); *H04N 21/4825* (2013.01); *H04N 21/4884* (2013.01)

(58) Field of Classification Search
USPC ...... 725/38, 39, 61, 86, 88, 92, 45; 715/744, 715/800, 808, 809; 455/466
See application file for complete search history.

(56) References Cited

U.S. PATENT DOCUMENTS

| | | | |
|---|---|---|---|
| 8,745,664 B2* | 6/2014 | Schwesinger ...... | H04N 5/44543 348/552 |
| 2006/0062550 A1* | 3/2006 | Lee ................. | H04N 5/76 386/296 |
| 2007/0154163 A1* | 7/2007 | Cordray ............. | H04N 21/6187 386/278 |
| 2009/0158336 A1* | 6/2009 | Newdeck ............. | G11B 27/322 725/44 |
| 2009/0249409 A1 | 10/2009 | Bhogal et al. | |
| 2009/0327853 A1* | 12/2009 | Dean ................. | G06F 17/243 715/221 |
| 2010/0043030 A1* | 2/2010 | White ................ | G11B 27/105 725/58 |
| 2011/0158610 A1 | 6/2011 | Paul et al. | |
| 2011/0196669 A1* | 8/2011 | Minami ............. | H04H 60/37 704/9 |
| 2013/0014159 A1* | 1/2013 | Wiser ................. | G06Q 30/0255 725/34 |

\* cited by examiner

SYSTEMS AND METHODS FOR COMPILING AND ORGANIZING MULTIPLE EPISODES OF MEDIA CONTENT SERIES

CROSS-REFERENCE TO RELATED APPLICATIONS

This application claims priority to U.S. Provisional Patent App. No. 62/097,241, filed Dec. 29, 2014, the contents of which are hereby incorporated by reference.

TECHNICAL FIELD

The present disclosure generally relates to the viewing of media content. More particularly, the following discussion relates to systems, methods, and devices for collecting and viewing multiple episodes of a series.

BACKGROUND

Recent years have seen a dramatic increase in the number and type of media content sources that a user typically has access to, including, for example, streaming services, IP video-on-demand, network television programming, media content stored on digital video recorders, and a wide range of other sources.

Given the increased availability of media content, it has become increasingly difficult for users to remain "caught up" on all episodes of any particular television series or other serial content. As a result, at any given time a user might have access to some episodes of a series, but not others, leading to a lack of continuity in viewing. This has led to an increased popularity in "binge watching" content—i.e., viewing an entire season or indeed multiple seasons of a show from beginning to end in a relatively short amount of time.

Such viewing behavior is best accomplished in a context in which all desired episodes are presented sequentially in an easy-to-access form, such as within a DVD collection or during a televised "marathon" of a series. However, DVD collections can be expensive, and series marathons may not occur within a timeframe that is desirable for the user. Given the wide range of available media content sources, it is generally an intractable task for a user to collect all episodes of a show in series-order using a simple electronic-program-guide interface.

Accordingly, there is a need for improved systems, devices, and techniques for compiling multiple episodes of a particular series for viewing by a user. These and other desirable features and characteristics will become apparent from the subsequent detailed description and the claims, taken in conjunction with the accompanying drawings and this background section.

BRIEF SUMMARY

Several examples of systems, devices, methods, and user interfaces are described for arranging multiple episodes of a series for convenient viewing. A method in accordance with one embodiment includes receiving a request, via a user interface presented to a user, to compile a requested plurality of episodes of a selected media content. The availability of the requested plurality of episodes is determined from a plurality of media content sources. The requested plurality of episodes are then compiled (e.g., recorded via a digital video recorder or located within a streaming service). A user interface is then presented to the user, including a series-order arrangement of the requested plurality of episodes.

A media device in accordance with one embodiment includes a processor and a memory configured to store computer-readable software instructions. The software instructions, when executed by the processor, cause the processor to: produce a first user interface; receive a request, via the first user interface, to compile a requested plurality of episodes of a selected media content; determine the availability of the requested plurality of episodes from a plurality of media content sources; compile the requested plurality of episodes; and present a second user interface including a series-order arrangement of the requested plurality of episodes.

Alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

Systems and methods are provided for collecting together one or more complete seasons of a TV series or other serial media content. A user requests a particular range of episodes in a series (e.g., all available episodes), and the media device acts as a user agent—employing all available sources (e.g., streaming sources, network television, stored programs, and the like) to locate the requested episodes and arrange them in series-order. When all of the requested episodes have been stored, identified, or otherwise located, the user is notified that "binge-watching" may commence. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
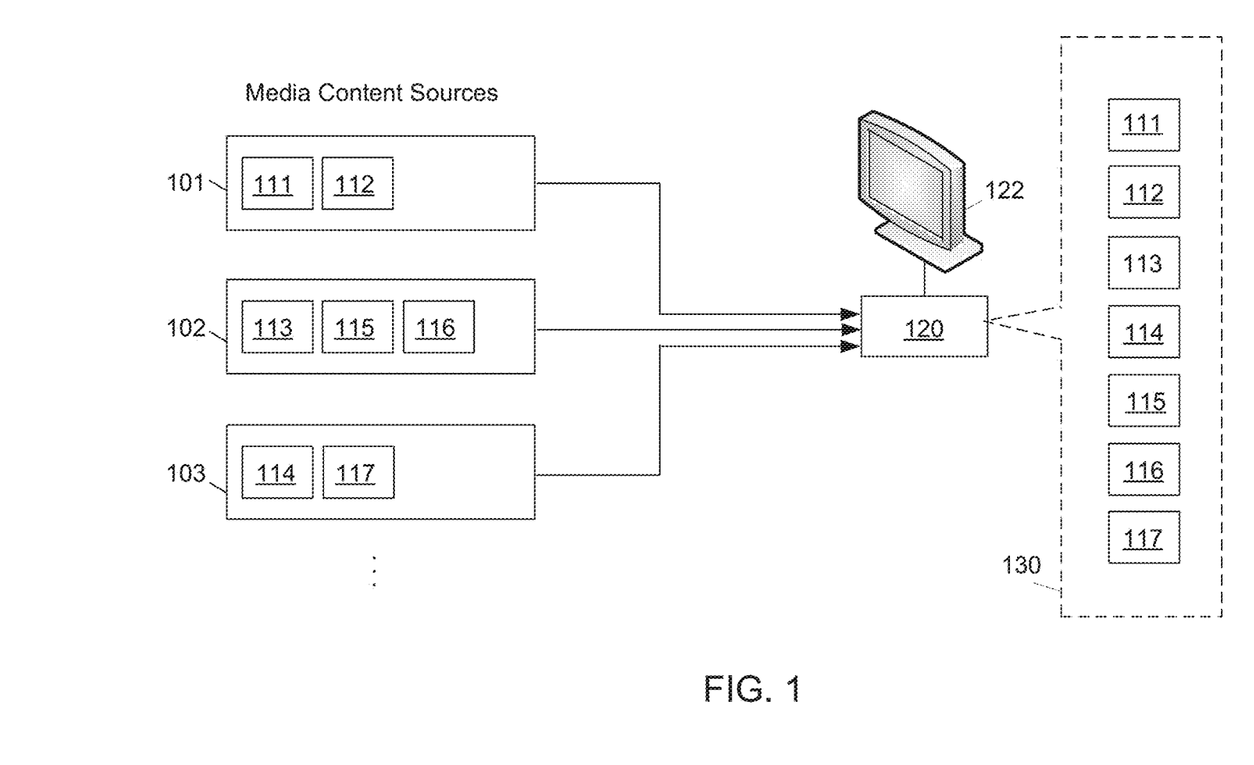
FIG. 1 is a conceptual block diagram illustrating a system for viewing media content in accordance with one embodiment.

Referring to FIG. 1, a media viewing system useful in describing the present invention generally includes one or more media content sources (or simply "content sources") 102, 102, 103, etc. communicatively coupled (e.g., over a network, via satellite, etc.) to a media device 120 (with one or more associated displays 122). Device 120 may correspond to any combination of hardware and software configured to receive and process media content from content sources 101-103, including, for example, a mobile telephone, a computer system (such as desktop computer, laptop computer, tablet computer, or the like), a set top box, a television receiver, or a dedicated media player.

Media content sources 101-103 may correspond to any type of source now known or later developed and may be communicatively coupled to media device via a variety of physical systems and protocols, including, for example, media streaming (e.g., IPVOD), traditional network programming sources, pay-per-view sources, satellite television, or the like.

In general, any particular media content source 101, 102, 103 may have one or more episodes of a given series of episodes. In FIG. 1, these episodes are illustrated sequentially as individual blocks 111-117, with episode 111 being the first episode in season 1, episode 112 being the second episode in a season 1, and so on, with seven episodes in total being illustrated. As noted above, because the episodes 111-117 are distributed over multiple media content sources 101-103, it can be a difficult for a user to methodically search each of the sources 101-103 and download or stream the desired episodes 111-117 in series order. Furthermore, to make the task more difficult, the availability of a particular episode at a given media content source will generally change over time. That is, for example, an episode may air on a network only one or two times, and may not be generally available after that time. More particularly, referring to FIG. 1, episode 111 and episodes 112 are illustrated as being available at media content source 101; however, at a future time, episode 111 may be unavailable from any of media content sources 101-103. Conversely, while not illustrated in FIG. 1, a given episode may be available from multiple media content sources 101-103.

In accordance with present embodiments, however, media device 120 allows a user to specify a range of episodes to compile (e.g., a selected season, all seasons, etc.), and media device 120 identifies the location of the requested episodes within media content sources 101-103 and presents them in series order 130 as shown in such a way that the actual media sources 101-103 are invisible to the user. As this process will generally not be accomplished instantaneously, the user is preferably notified when compilation is complete. In this way, the user can easily arrange to "binge-watch" a particular series when desired.

Figure 2:
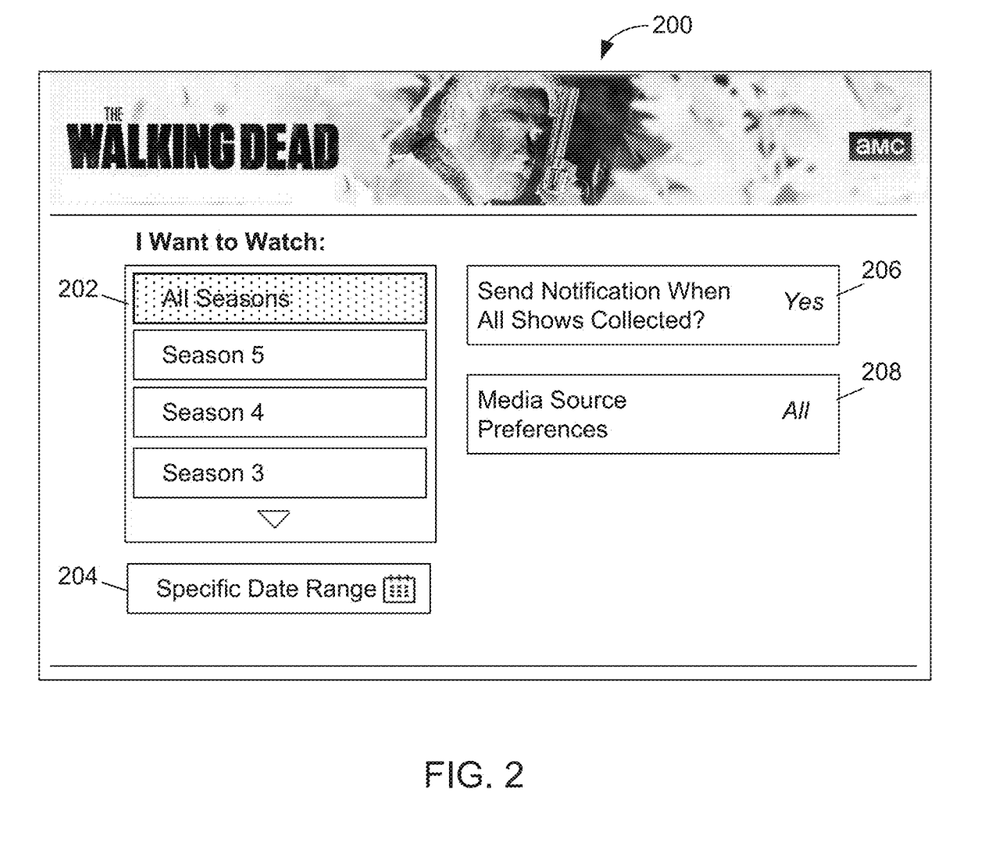
FIG. 2 is a conceptual illustration of an episode-selection user interface in accordance with one embodiment.
Figure 4:
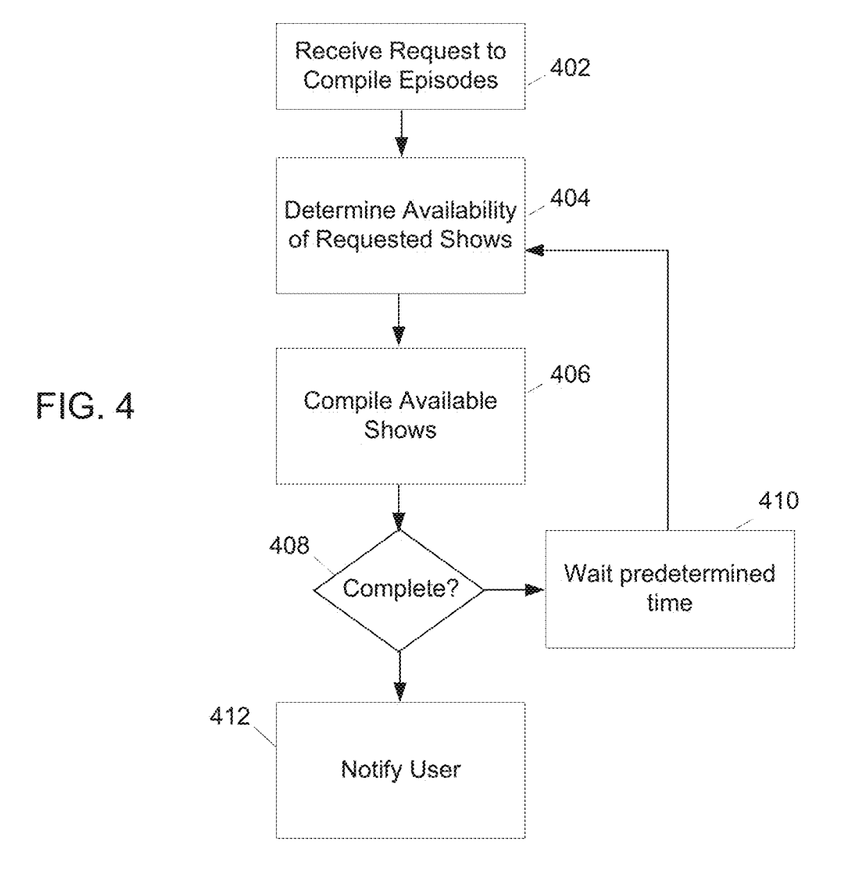
FIG. 4 is a block diagram illustrating a method in accordance with one embodiment.

FIG. 4 is a flow-chart depicting, in the general sense, a method in accordance with one embodiment. Initially, at step 402, the media device 120 receives a request to compile the desired episodes. This may be accomplished via a suitable user interface produced by media device 120. In this regard, FIG. 2 depicts just one example of a user interface 200 that includes a selection region 202 allowing the user to specify which episodes are to be compiled (e.g., All Seasons, Season 5, Season 4, Season 3, etc.). In FIG. 2, the interface object for "All Seasons" is selected (shaded region). The user may also provided with a user interface element 204 that allows the user to specify a particular date range, rather than one or more seasons. The user may also be able to specify (via element 206) whether a notification (e.g., a pop-up alert, an e-mail, or the like) is to be presented to the user when compilation is complete. The user may further specify (via element 208) media source preferences. For example, the user may prefer to record content locally on a DVR rather than streaming the content over a network. Those skilled in the art will recognize that the example user interface of FIG. 2 is not intended to be limiting, and that any suitable collection of user interface elements, buttons, lists, and the like may be employed.

Referring again to FIG. 4, the system continues by determining the availability of the requested episodes (step 404) and compiling them (step 406). Determining the availability of the show may be accomplished in a variety of ways, depending upon the media content sources 101-103. For example, media device 120 may query all available EPGs, VOD content sources, and the like and then determine (based, for example, on preferences set by the user), which of those sources should be used for each individual episode. As used herein, the phrase "compiling" (as in step 406) refers to making an episode available to the user. While in some cases this might include recording one or more episodes on a local DVR, it might also include identifying an address from which one or more episodes may be streamed (e.g., via IPVOD).

At step 408, the system determines whether compilation is complete. If so, a notification is provided to the user (step 412); if not, the system returns to step 404 after some predetermined time and continues to check for the availability of the requested shows. This predetermined time may be pre-set (e.g., one day, two days, etc.), or may be configurable by the user. As will be appreciated, the time necessary to compile a series of requested episodes may vary widely, from a few hours to many weeks, depending upon the nature of the request.

Figure 3:
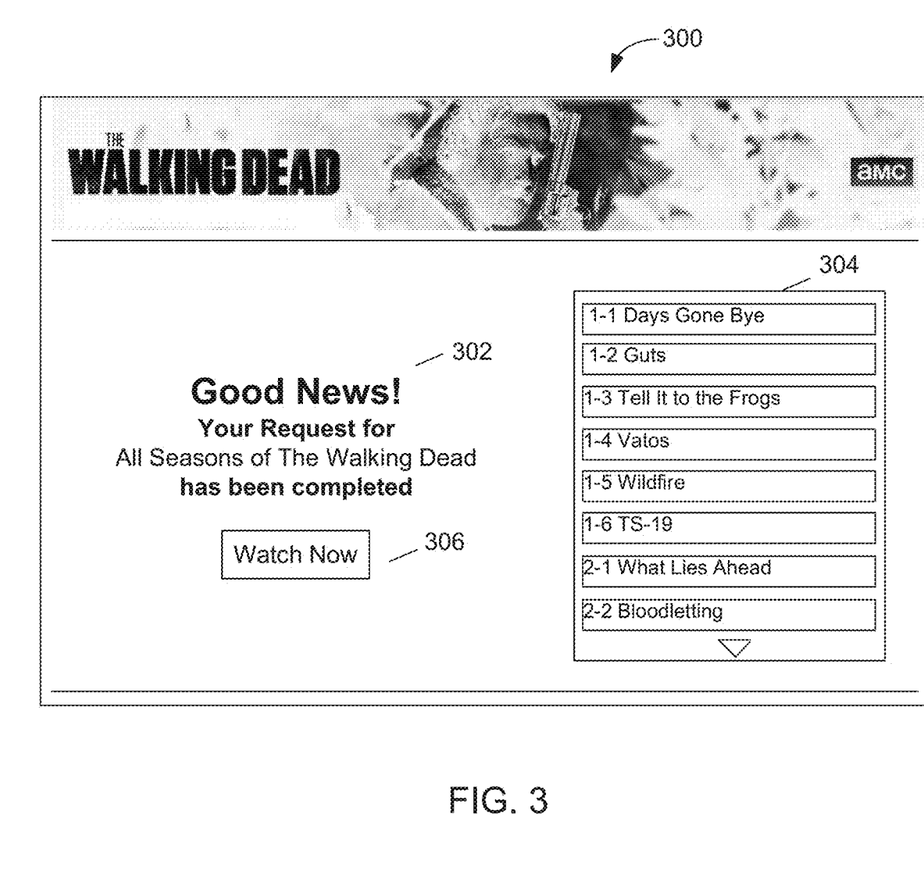
FIG. 3 is a conceptual illustration of a notification user interface in accordance with one embodiment.

Notification of the user (step 412) may take a variety of forms. FIG. 3 illustrates just one example user interface 300, which includes notification text 302, a list of compiled episodes 304, and a "watch now" button that allows the user to begin "binge-watching" from the beginning of list 304.

Figure 5:
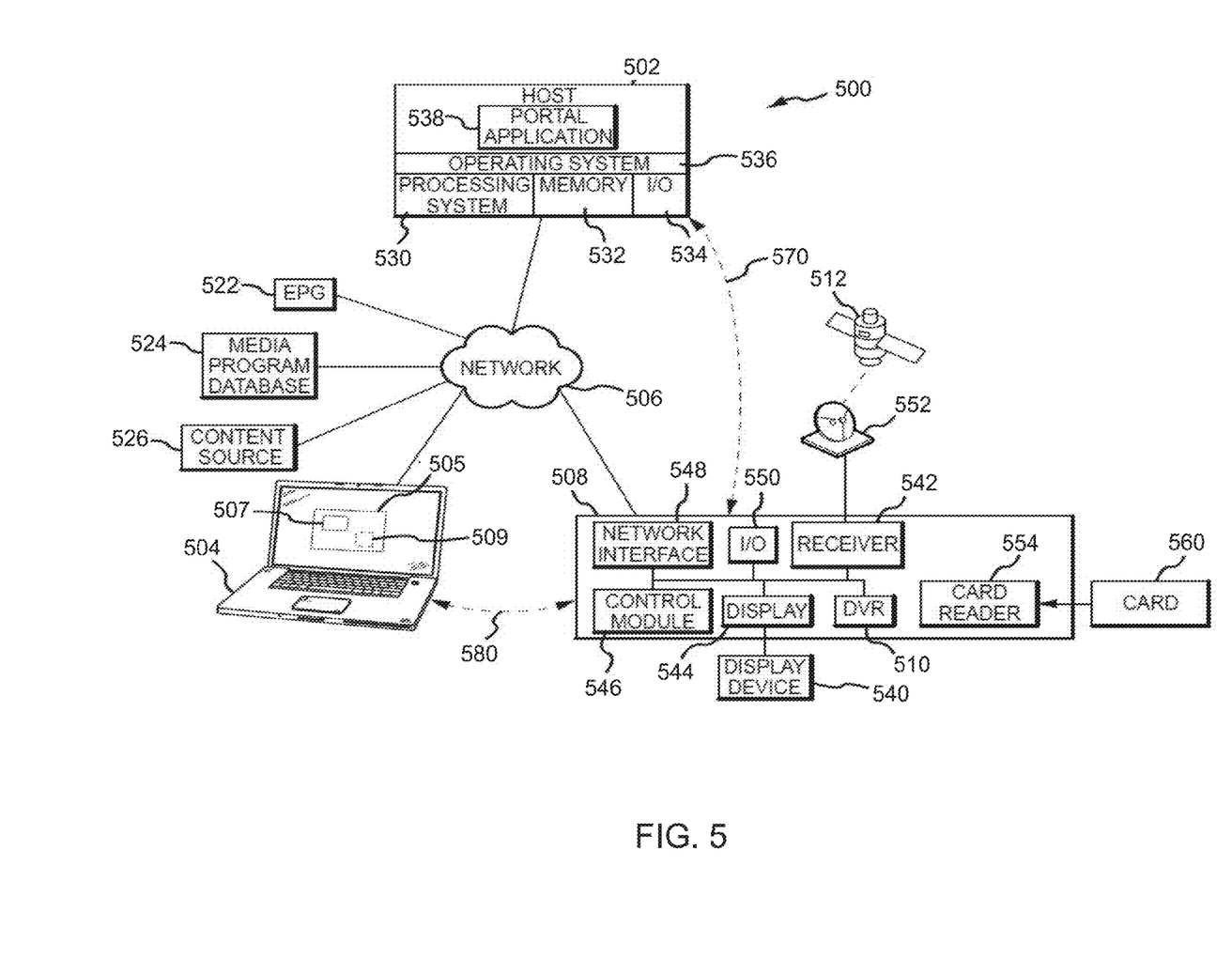
FIG. 5 is a block diagram illustrating a place-shifting system in which the present embodiments may be implemented.

The above systems and methods may be implemented in the context of a wide variety of entertainment devices and systems. FIG. 5 depicts one, non-limiting, example: a system 500 for placeshifting or otherwise transferring data or content, such as a media program (or media content), from a source electronic device 508 to a destination electronic device 504 over a network 506 for presentation to a user (or viewer) on the destination electronic device 504. For purposes of explanation, but without limitation, the source device 508 may be alternatively referred to herein as a media device or a placeshifting device, and the destination electronic device 504 may be alternatively referred to herein as a playback device or a client device (or client). The placeshifting system 500 also includes a host server 502 (or host) that communicates or otherwise interacts with the devices 504, 508 over the network 506 to facilitate establishment of a peer-to-peer connection 580 over the network 506, which may be utilized for a placeshifting session, as described in greater detail below. It should be understood that FIG. 5 is a simplified representation of the placeshifting system 500 for purposes of explanation is not intended to limit the subject matter described herein in any way.

In practice, the client device 504 may be any device, component, module, hardware and/or the like that is capable of communicating with the server 502 over network 506. For example, depending on the embodiment, client device 504 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 506 and presenting audio and/or visual content. In this regard, the client device 504 includes a display device, such as a monitor, screen, or another conventional electronic display, capable of graphically presenting visual content, data and/or information that is generated or otherwise provided by an application 505, 507 executing on the client 504. The client device 504 may further include a user input device, such as a keyboard, a mouse, a touchscreen, or the like, capable of receiving input data and/or other information from the user of the client device 504. The client device 504 also includes a processing system and a data storage element (or memory) that is coupled to or otherwise accessed by the processing system and stores programming instructions that, when read and executed, cause the processing system of the client device 504 to generate one or more applications 505, 507, 509 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 504 may reside at a geographic location that is remote or otherwise physically distinct from the geographic location of the media device 508. In this regard, the media device 508 may have an essentially fixed or permanent geographic location, whereas the geographic location of the client 504 may be transient or otherwise variable with respect to the location of the media device 508. For example, the media device 508 may be realized as a set-top box or a similar device that resides at a user's home for providing media content to the user's television or other home display device 540, while the client 504 is realized as a portable electronic device, such as a mobile phone or other mobile computing device, that moves about with the user.

In the embodiment shown in FIG. 5, client device 504 executes a conventional browser or other client application 505 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), JAVASCRIPT, and/or the like). Many browsers are also capable of executing "plugin" applications, applets or the like. Such plugins may be formatted in accordance with ACTIVEX, JAVA, JAVASCRIPT and/or any number of other formats. A number of commonly used web browsers are available for a number of different computing platforms, and the subject matter described herein is not limited to any particular browser application. In the illustrated embodiment, client 504 further includes a media player application 507. The media player 507 may be a standalone media player, or the media player 507 may be implemented as a plugin or other applet that runs within the client application 505 as desired. In some embodiments, media player 507 is initially obtained from a networked host, such as server 502. The media player 507 may be retrieved on an as-needed basis in some embodiments, or may be stored at client 504 for subsequent execution.

With continued reference to FIG. 5, in exemplary embodiments, media device 508 is any form of device, module, component, hardware and/or the like capable of receiving and processing media content from one or more content sources. For example, in some embodiments, media device 508 is a set-top box (STB) or similar system that is able to receive television programming and/or to record certain programs that can be viewed on a display device 540, such as a television, monitor, liquid crystal display (LCD), light emitting diode (LED) display, plasma display, or the like. Exemplary embodiments of media device 508 will therefore include or otherwise be coupled to a receiver interface 542 for receiving satellite, cable and/or broadcast programming signals from broadcast sources 512, as well as a data storage medium 510 (e.g., a hard disk, flash memory, or another suitable non-volatile data storage element) to support a digital video recorder (DVR) feature and/or functionality, a display interface 544 for providing imagery to the display device 540, and a control module 546 that directs the operations of the media device 508 as appropriate. For convenience, but without limitation, the data storage medium 510 is alternatively referred to herein as a DVR. Media device 508 may also include one or more interfaces 548 to the network 506 and/or an input/output interface 550 to a remote control or other device for providing user inputs to the media device 508, as appropriate. For example, the network interface(s) 548 of the media device 508 may include an interface or port for a wired communications layer (e.g., an Ethernet port or adapter), an interface for a wireless communications layer (e.g., an IEEE 802.11-compatible transceiver), and/or the like.

The components in media device 508 may be provided within a common chassis or housing as depicted in FIG. 5, although equivalent embodiments may implement media device 508 with any number of inter-connected but discrete components or systems. For example, in some embodiments, the media device 508 may be realized as a combination of a STB and a placeshifting device, wherein some features of the media device 508 (e.g., the DVR 510, the receiver 542, the display interface 544, and/or I/Os 550) are implemented by the STB and other features of the media device 508 (e.g., the network interface 548) are implemented by the placeshifting device, wherein the placeshifting device works in conjunction with the STB to shift the viewing experience from a home television (e.g., display device 540) to a viewing display on the client device 504 that is accessed via the network 506. Examples of placeshifting devices that may be used in some embodiments of media device 508 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 508 may be a hybrid DVR and/or receiver, for example, that also provides transcoding and placeshifting features. It should be appreciated that FIG. 5 depicts merely one exemplary embodiment of a media device 508, and in practice, the media device 508 may be logically and physically implemented in any manner to suit the needs of a particular embodiment.

In the exemplary embodiment illustrated in FIG. 5, media device 508 is capable of receiving digital broadcast satellite (DBS) signals transmitted from a broadcast source 512, such as a satellite, using an antenna 552 that provides received signals to the receiver 542. Equivalent embodiments, however, could receive programming at receiver 542 from any sort of cable connection, broadcast source, removable media, network service, external device and/or the like. In some embodiments, the media device 508 may also include an access card interface or card reader 554 adapted to receive an access card 560 (or viewing card) configured to ensure that the viewer is authorized to view media content provided to the primary display device 540. In this regard, the access card 560 includes unique identification information associated with a particular subscriber to the broadcast content source 512 or otherwise includes subscription information that facilitates receiving and/or decoding media content provided by the broadcast content source 512.

The DVR 510 feature stores recorded programming (e.g., recorded broadcast programming received via receiver 542) on a hard disk drive, memory, a networked server, or other storage medium as appropriate in response to user/viewer programming instructions, wherein the recorded programming may be subsequently viewed via the media device 508, either on display device 540 or client device 504 via network 506. Content stored in DVR 510 may be any sort of file-based programming or other content that is accessible to media device 508. In various embodiments, in addition to storing broadcast programming, the DVR 510 may also store programming received from other sources not illustrated in FIG. 5, such as, for example, programming downloaded from an on-demand programming source or an online programming source. Additionally, content in DVR 510 may be stored in any sort of compressed or uncompressed format, as desired, and may be encoded or transcoded as desired for effective receipt, storage, retrieval and playing.

The control module 546 is any sort of hardware, circuitry, processing logic and/or other components capable of directing the operations of media device 508. In various embodiments, control module 546 includes software or firmware logic and/or other programming instructions residing in memory and executing on any sort of processing system, such as any sort of processor, microprocessor, microcontroller, digital signal processor or the like. The instructions, when read and executed, cause the control module 546 to perform various tasks, functions, processes and/or operations and otherwise support the subject matter described herein. In various embodiments, the control module 546 is based upon a "system on a chip" (SoC) implementation that incorporates a hybrid microcontroller with memory, input/output and other features to perform the various signal processing and other actions of media device 508. Other embodiments may implement control module 546 and/or the other features of media device 508 with any number of discrete and/or integrated processing components (e.g., any sort of microprocessor or microcontroller), memories, input/output features and/or other features as desired. The control module 546 communicates with the network interface 548 to establish a peer-to-peer connection 580 to the client device 504 over the network 506 and support streaming of media programs (e.g., from the DVR 510 or the receiver 542) to the client device 504 over the network 506 via the peer-to-peer connection 580, as described in greater detail below.

In the embodiment of FIG. 5, the network 506 is any communications network (or a combination of communications networks) capable of transmitting data between devices within the system 500. In various embodiments, network 506 includes any number of public or private data connections, links or networks supporting any number of communications protocols. Network 506 may include the Internet, for example, or any other network. Such networks may be based upon TCP/IP or other conventional protocols, although other embodiments may use any type of alternate or successor protocols, as desired. In various embodiments, network 506 may also incorporate a wireless and/or wired telephone network, such as a cellular communications network for communicating with mobile phones, personal digital assistants, and/or the like. Various embodiments of network 506 may also incorporate any sort of wireless or wired local area networks (LANs), wide area networks (WAN), or the like.

In the illustrated embodiment of FIG. 5, the server 502 may be realized as one or more server computers or other device(s) coupled to the network 506 and capable of interacting with the devices 504, 508 to facilitate communications between the client device 504 and the media device 508 associated with the user or operator of the client 504. The server 502 may be implemented with a server computer system or data processing system that is based upon any processor, architecture and/or operating system, and will typically be implemented using a processing system 530, memory 532, and input/output features 534. Various embodiments may be implemented using dedicated or shared hardware servers; other implementations may make use of virtual server features as part of a "cloud computing" service, such as any of the cloud computing services provided by any number of providers.

While FIG. 5 illustrates a single server 502, many practical embodiments of the system 500 may provide a cluster or other collection of multiple host servers 502 to support any desired number of simultaneous communications with multiple clients 504 and/or multiple media devices 508. This cluster may also incorporate appropriate routing, load balancing, access and security mechanisms and or any number of other features. In various embodiments, each server 502 is an actual or virtual computer system executing an operating system 536 in conjunction with the processing system 530, memory 532 and/or I/O features 534 to provide a computing core that is capable of executing a portal application 538, as well as any number of daemons, processes, applications or other modules as desired. For example, a portal application 538 could execute as a daemon on the server 502, with connections to separate clients 504 being managed as separate processes or instances that communicate with portal application 538 using features provided by operating system 536. In one or more embodiments, the memory 532 stores programming instructions that, when read and executed, cause the processing system 530 to create, generate, or otherwise facilitate the portal application 538 and perform various tasks, functions, processes and/or operations described herein. In this regard, the memory 532 represents any non-transitory short or long term data storage element or other computer-readable media capable of storing programming instructions for execution by or on the processing system 530.

The user of the client 504 is able to connect to the portal application 538 supported by host 502 via the network 506, for example, by directing the client application 505 to a URL or other network address associated with host 502 and/or portal application 538. In exemplary embodiments, after the user is successfully authenticated by the portal application 538, the host 502 and/or portal application 538 establishes a connection 570 over the network 506 to the media device 508 that is associated with the user. Thereafter, the host 502 and/or the portal application 538 utilizes the connection 570 to obtain, from the media device 508 via the network 506, information about programming stored at the media device 508 and available for placeshifting to the client device 504, such as, for example, a listing of the media programs stored on DVR 510. It should be noted that although FIG. 5 depicts the network connection 570 as being between the host 502 and the media device 508, in practice, the placeshifting system 700 may include one or more intermediary components (e.g., one or more message servers) configured to establish, facilitate, or otherwise support the connection 570.

Server 102 is coupled to an electronic program guide 122, which may be realized as a server, a database, or another device operating on the network 106 that maintains information pertaining to current and/or future broadcasts (or airings) of media programs that are available to be received from broadcast source 112 (e.g., by the media device 108 via receiver 142 and/or antenna 152). The server 102 and/or the portal application 138 may obtain information pertaining to current and/or future broadcasts (or airings) of media programs from the electronic program guide 122 and generate or otherwise provide a program guide graphical user interface (GUI) display on the client device 104 (e.g., within client application 105) that indicates media programs that are or will be available for streaming from the media device 108. The user of the client device 104 may manipulate or otherwise utilize the graphical user interface (or the graphical user interface elements contained therein) to select or otherwise identify media programs for streaming to the client device 104 and/or recording to the DVR 110. The user may pause or otherwise stop presentation of the streamed media program and manipulate or otherwise operate the client application 105 to transmit or otherwise provide 412, via the network 106, a request for content to a third-party content source 126 (e.g., a third-party website). The third-party content source 126 responds to the request by transmitting or otherwise providing content to the client device 104 via the network 106.

In the illustrated embodiment of FIG. 1, the placeshifting system 100 also includes a media program database 124 that includes verified or validated metadata and/or other descriptive information for a vast array of media programs. For example, the media program database 124 may contain metadata and/or other descriptive information pertaining to substantially all of the media programs that may be available from one or more content sources within placeshifting system 100 (e.g., information pertaining to any media programs that have previously been aired by a broadcast source 112, along information pertaining to any movie that has been presented in theaters, made available on-demand, or released for individual use (e.g., on digital video disc (DVD) or the like)). In exemplary embodiments, for each media program having a record (or entry) in the media program database 124, the media program database 124 maintains a media data object that includes one or more fields of metadata associated with that media program along with one or more fields of program identifiers that may be used to identify that media program record. In this regard, the program guide 122 and the media program database 124 may utilize the same program identifiers to uniquely identify each media program.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of organizing media content, comprising:
    receiving a request, via a first user interface presented to a user, to compile a requested plurality of episodes of a selected media content;
    determining the availability of the requested plurality of episodes from a plurality of types of media content sources, the types of media content sources including media streaming, network programming sources, pay-per-view sources, and satellite sources;
    compiling the requested plurality of episodes;
    presenting a second user interface including a series-order arrangement of the requested plurality of episodes; and
    place-shifting the requested plurality of episodes to a remote device.

2. The method of claim 1, further including providing a notification that the requested plurality of episodes have been compiled.

3. The method of claim 2, wherein the notification is a pop-up alert displayed on the first user interface.

4. The method of claim 2, wherein the notification is an e-mail addressed to the user.

5. The method of claim 1, wherein compiling the requested plurality of episodes includes at least one of recording an episode on a digital video recorder and determining the location of an episode within a video streaming service.

6. The method of claim 1, further including place-shifting the requested plurality of episodes to a mobile device.

7. A media device comprising:
    a processor;
    a memory configured to store computer-readable software instructions which, when executed by the processor, cause the processor to:
    produce a first user interface;
    receive a request, via the first user interface, to compile a requested plurality of episodes of a selected media content;
    determine the availability of the requested plurality of episodes from a plurality of types of media content sources, the types of media content sources including media streaming, network programming sources, pay-per-view sources, and satellite sources;
    compile the requested plurality of episodes;
    present a second user interface including a series-order arrangement of the requested plurality of episodes;
    place-shift the requested plurality of episodes to a remote device.

8. The media device of claim 7, wherein the processor is further configured to provide a notification that the requested plurality of episodes have been compiled.

9. The media device of claim 7, wherein the notification is a pop-up alert or an e-mail message.

10. The media device of claim 7, wherein compiling the requested plurality of episodes includes at least one of recording an episode on a digital video recorder and determining the location of an episode within a video streaming service.

11. A media content organization system comprising:
    a plurality of media sources;
    a media device communicatively coupled to the plurality of media sources, the media device configured to produce a first user interface; receive a request, via the first user interface, to compile a requested plurality of episodes of a selected media content; determine the availability of the requested plurality of episodes from the plurality of types of media content sources, the types of media content sources including media streaming, network programming sources, pay-per-view sources, and satellite sources; compile the requested plurality of episodes; present a second user interface including a series-order arrangement of the requested plurality of episodes; and place-shift the requested plurality of episodes to a remote device.

12. The system of claim 11, wherein the media device is a placeshifting device.

13. The system of claim 11, wherein the media device is further configured to provide a notification that the requested plurality of episodes have been compiled.

14. The system of claim 13, wherein the notification is a pop-up alert or an e-mail message.

15. The system of claim 11, wherein the media device compiles the requested plurality of episodes by recording an episode on a digital video recorder or determining the location of an episode within a video streaming service.

* * * * *